UNITED STATES PATENT OFFICE.

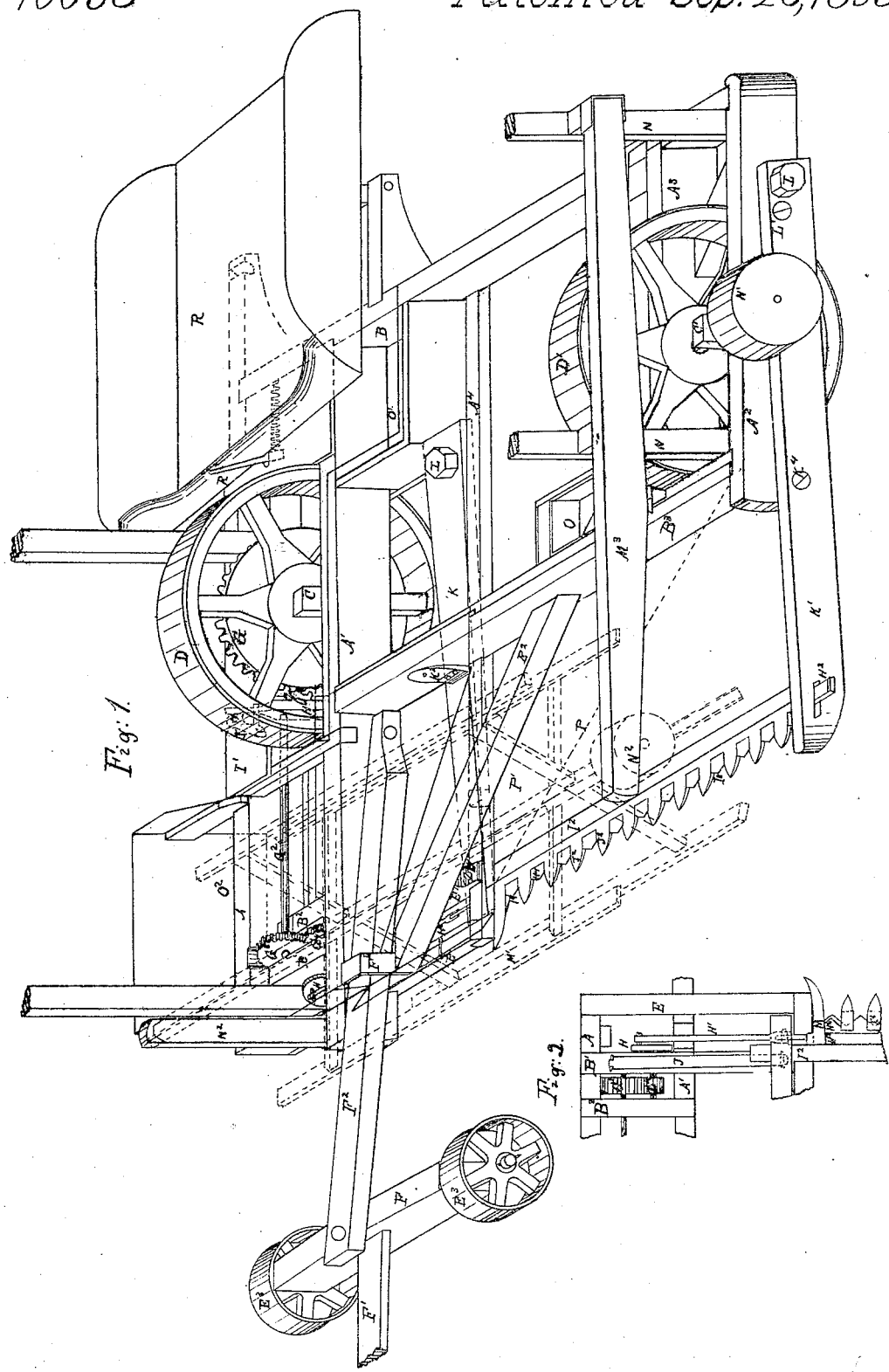

AUGUSTUS ADAMS AND PHILO SYLLA, OF ELGIN, ILLINOIS.

IMPROVEMENT IN GRAIN AND GRASS HARVESTERS.

Specification forming part of Letters Patent No. 10,038, dated September 20, 1853.

*To all whom it may concern:*

Be it known that we, AUGUSTUS ADAMS and PHILO SYLLA, both of Elgin, in the county of Kane and State of Illinois, have invented certain new and useful Improvements in Machines for Harvesting Grain, Mowing Grass, &c., called "Sylla & Adams's Harvester and Mower;" and we do hereby declare that the same is described and represented in the following specification and drawings.

The nature of our invention consists in fastening the sickle bar or stock to the ends of two levers, so as to allow it to vibrate perpendicularly and accommodate the sickle to uneven ground in cutting grass, the weight of the sickle-bar and sickle being properly counterbalanced by weights upon the opposite ends of the levers, which levers may be made permanent by bolts or otherwise when cutting grain, the sickle-bar being connected to the carriage-frame by a strong link which is hinged to the sickle-bar and to the carriage near the crank-shaft, so as to allow the bar to vibrate perpendicularly and to prevent it from being traversed longitudinally by the motion of the sickle; and in making the platform which receives the grain as it is cut to incline diagonally and terminate upon a horizontal platform, to which the cut grain is moved by the raker and placed before the men who bind it; also, in providing stands or platforms for the binders to stand upon so much below the horizontal platform upon which they bind the grain that they can do it much easier and faster, thereby enabling the binders to bind from fifty to one hundred per cent. more when they do it upon the carriage than they could upon the ground; and, lastly, in providing a dumping-box to carry the sheaves together and to measure the quantity put in each shock, thereby saving the labor of one man in collecting the sheaves.

To enable others skilled in the art to make and use the improvements which we have invented, we will proceed to describe their construction and the mode of using them, referring to the drawings above mentioned, in which the same letters indicate like parts in each of the figures.

Figure 1 is an isometrical projection; Fig. 2, a plan of a portion of the under side, representing such parts as could not be shown to advantage in the other drawing.

In the accompanying drawings, A A' A² are the rails, connected together at the rear by the bar B, and the two former, near their front ends, by the bars B' and B², and the two latter by the bar B³, as represented. These rails and bars form main frame, to which the other parts are attached or connected. There are two slides, like C, with holes in them for the pivots of the wheel D, fastened to the rails A and A' by bolts, so as to set them and adjust the frame to the height required. The rail A³ is framed into the bars B and B³, as represented, and there are two slides, like C', with holes in them for the pivots of the wheel D', which slides are fastened to the rails A² A³, and may be set, as above mentioned, to adjust the frame as required. There is a bottom rail, A⁴, fastened to the under edges of the bars B B³, and extends forward and is fastened to the ends of the bars E and E', which bars are fastened to the under edges of the rails A A' in the position represented. There is a brace-bar, E², which passes from the rear corner behind the wheel D', through the rail A³, bar B³, and is fastened to the bars E and E', as represented, to stiffen and support the frame. The forward wheels, E³ E³, carry the axle F and tongue F', to which the team may be hitched in some convenient manner to draw the machine, which is connected to the axle F and rail A' by the beam F², as represented, which is confined sidewise by the strap F³, fastened to the rail A' and bar E, and wedges may be placed in this strap, either above or below the beam F², so as to adjust the machine as desired; or the rear end of the beam may be fastened higher or lower on the rail A' for the same purpose. The gear G is fastened to the wheel D and drives the pinion G' on the shaft G², which carries the gear G³ to drive the pinion G⁴, and operate the crank H and pitman H' to traverse the sickle H², which cuts the grain, grass, &c. The shaft G² turns in the lever H³, which is hinged to the lower edge of the rail A, and may be vibrated, so as to throw the pinion G' out of gear, and fastened in either position by the tongued lever I, fastened to the board I', which board I' is fastened upon the top of the frame, as represented, and has a hole cut through it for the lever H³ to vibrate in. The opposite end of the shaft G² turns in the bar B', and the shaft of the pinion G⁴ and crank H turns in the bars B' B², the bar B' being connected to the sickle-bar I² by the link J, Fig. 2, which link is hinged to both bars by strong staples, so as to allow the sickle-bar $I^2$ to vibrate perpendicularly and accommodate itself to uneven ground in cutting grass, and to prevent it from being traversed endwise by the motion of the sickle $H^2$ and the action of the grass or grain as it is pressed against the sides of the fingers $J^2 J^2$ as it is severed by the sickle $H^2$. The sickle-bar $I^2$ is fastened to the levers $K K'$, which are hung so as to vibrate freely, the lever K to the bar $B^3$ by the hinge $K^2$, and $K'$ by the bolt $K^4$ in the rail $A^2$, and the weight of the sickle-bar and sickle is counterbalanced to the extent required by the weights L L, fastened to the rear ends of the levers when cutting grass, and when cutting grain the rear end of the lever $K'$ may be secured to the rail $A^2$ by the bolt $L'$, and the lever K by the bolt $L^2$ through the bar $B'$ and rail $A^4$.

The sickle $H^2$ is made of a stiff bar of metal, the ends being fitted to traverse on the plate M and in a slot in the lever $K'$, and the teeth $H^4$ are made of plate metal, one or more in the same piece, and fastened to the bar. The sickle traverses just in front of the sickle bar or stock $I^2$, to which the fingers $J^2$ are fastened, which fingers project over the sickle, as represented, and are reduced to a point, and they have a projection, $I^3$, on the under side, which extends back under the teeth of the sickle to the bar $H^2$, but may be left a little short of the bar, if preferred, so as to allow any fine grass or leaves that may be carried across the projection $I^3$ by the teeth of the sickle to be brushed back by the stubble as the machine is carried over it, so as to fall out and not obstruct the motion of the sickle or clog it, as it does when the under portion of the fingers extends back under the sickle to the bar $I^2$ or stock.

One pivot of the reel $M'$ (represented by red lines) turns in the standard $M^2$, fastened to the rail $A'$, and the other in the bar $M^3$, which is supported by the standards N N, fastened to the rail $A^2$, as represented. The reel $M'$ is turned by a band from the pulley $N'$ on the axle of the wheel $D'$ to the pulley $N^2$ on the pivot of the reel. The bars of the reel strike the tops of the grass or grain and sweep them back over the sickle and stock, so as to let the grass fall to the ground between the bars $I^2$ and B as it is cut and allow the machine to pass over it.

Having described the construction of our machine as we use it for cutting grass or other products which are to be left on the ground without being bound into sheaves, we will proceed to describe the parts used in cutting and binding grain, &c.

We construct a box, O, in the position represented, with a bottom nearly or quite as low as the under side of the frame for the raker to stand in, and a box, $O'$, for one of the binders to stand in, and a box, $O^2$, for another or second binder to stand in, and if two binders are insufficient a box similar to $O^2$ may be constructed of sufficient capacity for one or more binders and fastened to the rear bar, B. The bottom or floor of each of these boxes upon which the binders stand should be nearly or quite as low as the under side of the frame, so as to relieve the binders from the necessity of stooping so low as they would have to do if their feet were as high as the platform upon which the grain is placed for them to bind. We now cover all that portion of the machine shaded blue with a platform of sheet metal or other suitable material. That portion of the platform next to the lever $K'$ is inclined from $B^3$ to $I^2$, and that portion, $P'$, between the dotted line P, bar $B^3$, and rail $A'$, is inclined diagonally from the dotted line to the top of the bar and rail, and the remaining portion of the platform is laid flat upon the frame, leaving the spaces vacant over the raker and binders' boxes, as represented. As the grain is cut by the sickle it falls upon the inclined portion of the platform, and when sufficient has fallen for a sheaf the raker, who stands in the box O, moves it with the greatest facility from the inclined portion of the platform, where it has fallen, to the level part with his rake, and places it before one of the binders, who stands in one of the boxes mentioned, and if there is more than one binder he can place it alternately before each of them in succession, and they can deposit the sheaves in the dumping-box R, which is made in the form represented, and the pivots of its axle turn in the rear ends of the rails A and $A'$, and when a sufficient quantity has accumulated in the box R to make a shock the lever $R'$, which has a notch on it for the edge of the bottom of the dumping-box, and is pressed against it by the spring $R^2$, is pulled back by the binder, and the load is deposited, thereby saving the labor of collecting the bundles to make a shock in the usual manner.

The great advantages of our machine, and those which give it pre-eminence over all other harvesting-machines, are these: The grain is bound upon the machine and carried together for shocking before it is thrown upon the ground, thereby greatly economizing the labor and avoiding the waste that occurs where the grain is thrown upon the ground before it is bound. From extensive observation and long experience we are satisfied that this waste is from one to two or two and a half bushels per acre, varying with different machines and the different conditions of the grain when cut; but in no case less than one bushel per acre, while with our machine this is wholly saved, or so nearly so that we do not waste more in cutting twenty acres than is wasted on one acre by the best machine where the grain is bound upon the ground.

By the use of our elevated platforms, and by keeping the grain out of the stubble, it is far easier for the binders to perform their labor, and consequently three hands on the machine are able to do as much as from five to six hands on the ground, while the use of the dumping-box saves nearly the labor of one man in carrying the sheaves together; and the labor of the raker in placing the grain upon the platforms before the binders is but little more than the labor of throwing it upon the ground.

What we claim as our invention, and desire to secure by Letters Patent, is—

1. The weighted levers K K', or their equivalents, substantially as described, which carry the sickle-bar and sickle and allow them to vibrate perpendicularly, and accommodate the sickle to uneven ground in cutting grass, which levers may be made permanent when cutting grain, substantially as described and represented.

2. The link or hinged brace J, or its equivalent, in combination with the weighted levers K K', which brace J prevents the sickle-bar from being traversed longitudinally by the action of the sickle, but allows it to vibrate perpendicularly and accommodate itself to uneven ground, substantially as described.

3. The stands of the binders, constructed so as to allow them to stand so much lower than the horizontal platform that they can bind the gavels into sheaves with greater facility, far less labor, and much faster than by any of the modes heretofore practiced.

In testimony whereof we have hereunto signed our names before two subscribing witnesses.

AUGUSTUS ADAMS.
      PHILO SYLLA.

Witnesses:
 A. J. WALDRON,
 A. GROW.